G. R. STEVENS.
Churn.
No. 79,702.
Patented July 7, 1868.
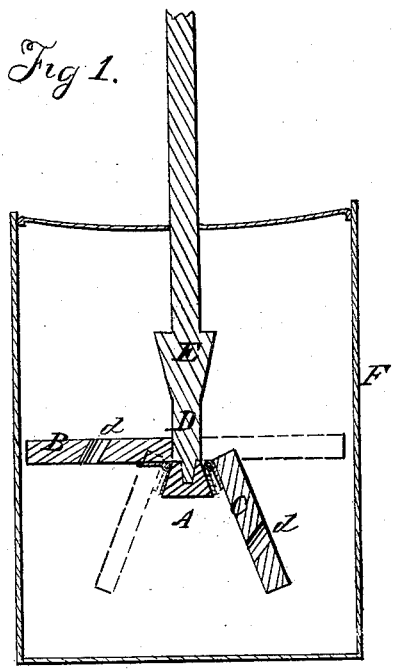
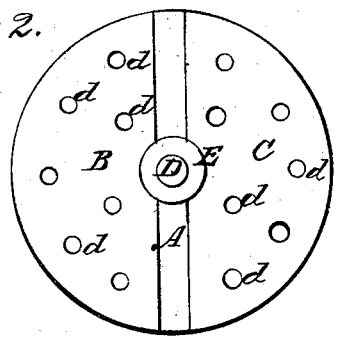
Witnesses.
G. S. Chapin
A. Hayward
Inventor.
G. R. Stevens

United States Patent Office.

G. R. STEVENS, OF CHICAGO, ILLINOIS.

Letters Patent No. 79,702, dated July 7, 1868.

---

IMPROVEMENT IN CHURNS.

---

*The Schedule referred to in these Letters Patent and making part of the same.*

---

TO ALL WHOM IT MAY CONCERN:

Be it known that I, G. R. STEVENS, of Chicago, in the county of Cook, in the State of Illinois, have invented a useful Improvement in Churns; and I do hereby declare that the following is a full and exact description thereof, reference being had to the accompanying drawings, and to the letters of reference marked thereon, making a part of this specification, in which—

Figure 1 is a central sectional elevation of my invention.

Figure 2, a plan view of the dasher, removed from the churn-barrel.

The nature of my invention consists in the use of a cone, attached to the dasher-rod at a suitable place to suddenly check the motion of the cream after it has been forced through diagonal holes in a winged dasher, which is hinged to a cross-piece, having inclined sides for the wings to strike against, and thus prevent them from coming too closely together when moving upward.

To enable others skilled in the art to fully comprehend the construction and operation of my invention, I have marked corresponding parts with similar letters, and will now give a detailed description.

A B C represent a wooden dasher, the centre-piece, A, of which is rigidly fixed to a dasher-rod, D, and has inclined edges, to which the wings B C are hung, by any common hinges, in the usual manner. These wings have holes, $d\ d$, &c., made through them, at such angles as will cause cream, forced through the holes by a downward motion of the dasher, to strike against an inverted frustum of a cone, E, which is made a part of the dasher-rod, D, and placed such a distance above the wings as will cause the cream, after striking the cone, to pass outward to the barrel of the churn F, from whence it will return under the dasher, by its upward movement, preparatory to its being again forced through the holes $d$, as described.

This arrangement is quite simple, yet it provides effectual means for giving to cream such an amount of friction as is necessary to speedily separate the particles of butter from milk, and gather them in a compact form preparatory to being removed from the churn.

I am well aware that winged dashers have been used before, and I therefore disclaim originality as to their invention; but the diagonal holes $d$, arranged to guide cream against the cone E, I consider not only new, but a very effectual means of keeping the cream in motion above the dasher.

I am not particular as to the style or kind of receptacle used to hold the cream, only so that it is arranged conveniently for the dasher to have a vertical reciprocating motion.

It will be seen, at fig. 1, that, when the rod E is being raised up, the wings B C will fall downward, and have an inclined position, but not so much inclined as to prevent them from swinging back to a horizontal position when being forced downward.

Having thus described my invention, what I claim, and desire to secure by Letters Patent of the United States, is—

The cone E, in combination with the rod D and winged dasher B C, the latter having holes, $d\ d$, made diagonally through it, substantially as and for the purpose herein set forth.

G. R. STEVENS.

Witnesses:
G. L. CHAPIN,
A. HAYWARD.